Figure 1:
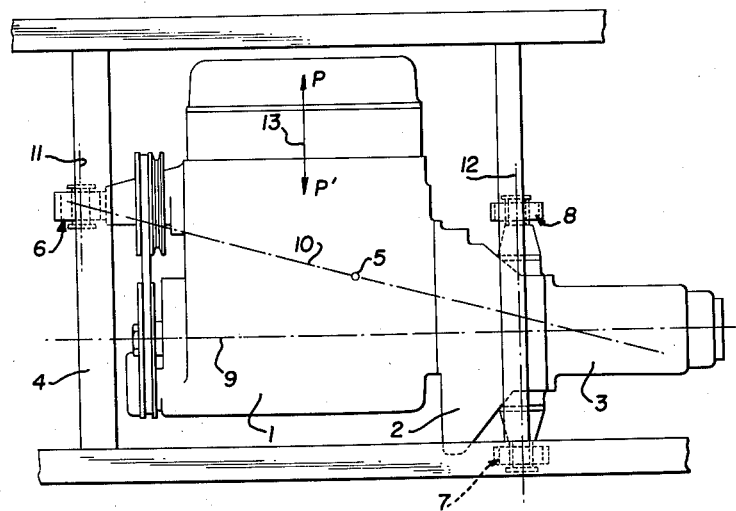

Jan. 30, 1962 A. H. MÜLLER 3,018,990
ELASTIC ENGINE SUSPENSION ESPECIALLY FOR MOTOR VEHICLES
Filed July 13, 1959

INVENTOR.
ALFRED H. MÜLLER
BY
Dicke, Craig and Freudenberg
ATTORNEYS

United States Patent Office 3,018,990
Patented Jan. 30, 1962

3,018,990
ELASTIC ENGINE SUSPENSION ESPECIALLY FOR MOTOR VEHICLES
Alfred H. Müller, Waiblingen, Germany, assignor to Daimler-Benz Aktiengesellschaft, Stuttgart-Unterturkheim, Germany
Filed July 13, 1959, Ser. No. 826,570
Claims priority, application Germany July 15, 1958
8 Claims. (Cl. 248—9)

The present invention relates to an elastic suspension or mounting for an essentially horizontally disposed piston-type internal combustion engine, especially for motor vehicles, which is combined into a unitary block with the clutch and transmission housings thereof, preferably by means of a forwardly disposed bearing support or mounting through which extends an axis passing through the center of gravity, and by means of two rearwardly disposed bearing supports or mountings disposed on each side of the crankshaft axis.

In the prior art motor vehicles provided with essentially horizontally disposed piston-type internal combustion engines, i.e., provided with piston-type internal combustion engines the cylinder axes of which extend horizontally or approximately horizontally, the combustion engines are elastically suspended for the most part in three points at the vehicle frame or vehicle body, and more particularly a forwardly disposed main bearing support or mounting and two rearwardly disposed main bearing supports or mountings are normally provided in these prior art devices. The forwardly disposed main bearing support is thereby arranged at the front end of the internal combustion engine in such a manner that the inertia axis of the piston-type internal combustion engine which extends approximately in the vehicle longitudinal direction extends simultaneously through the forwardly disposed main bearing support or mounting. The two rearwardly disposed main bearing supports are arranged at the height of the clutch housing along the rear end of the internal combustion engine to both sides of the crankshaft axis. The main bearing supports or mountings themselves of these prior art arrangements are formed either as elastic cushions which are arranged directly between the vehicle frame and the engine housing, or the engine housing is connected with the vehicle frame by means of relatively short guide rods or levers provided with elastically constructed joints at each end thereof.

Furthermore, suspensions of piston-type internal combustion engines in motor vehicles are known in which the individual bearings or mountings, namely a forwardly disposed bearing support or mounting and two rearwardly disposed bearing supports or mountings are of identical construction and are structurally so designed and arranged that they exhibit no preferred direction for the swinging movements thereof. The last-described arrangement and construction of prior art type bearing supports or mountings, however, are not suited to accommodate and absorb in a satisfactory manner the different forces acting thereon which are produced by the piston-type internal combustion engine. The reasons for this unsatisfactory performance of these prior art mountings or bearing supports may be briefly summarized as follows:

The main bearings of an engine suspension are subjected, as is known, to very different loads and stresses. Particularly the main bearings of the suspension of drive aggregates or units installed or built into motor vehicles and consisting of a piston-type internal combustion engine with a clutch and transmission housing rigidly secured thereto have to have regard to the most varied tasks and have to satisfy the multiple operating conditions resulting therefrom. This is so since, on the one hand, the static weight of the drive aggregate or unit rests on the main bearings and, on the other, the free inertia forces act thereon, especially with engines having four or fewer cylinders, which, for example, with an internal combustion engine of the piston type having four cylinders may amount approximately to the static weight of the engine. Furthermore, the main bearings or mountings are also intended to absorb the reaction moments coming from the engine or the change-speed transmission thereof. Additionally, the main bearings have to brace or support the clutch pressure with respect to the vehicle frame which acts in the axial direction. Moreover, the main bearings are subjected continuously to rattle and shaking movements caused by unevennesses and obstacles in the road surface.

In order to relieve the main bearings from the manifold loads and stresses to which they are thus subjected and for which they are not suited nor form a satisfactory match, additional elastic supports are normally provided in the known prior art suspensions of drive aggregates, and more particularly in the form of support arms secured to the engine housing which become effective in the one or the other load direction, either in order to assist to absorb the free inertia forces or the moments or to brace the clutch pressure in the axial direction thereof.

The present invention is concerned with the problem and task to realize an arrangement in which all of the loads and stresses are absorbed effectively exclusively with the help of the main bearings, i.e., without any auxiliary supports, and to construct the main bearings in such a manner that they are capable to absorb and control all of the forces in an advantageous manner with due regard to the operating requirements of and importance to the vehicle and internal combustion engine so that a satisfactory mounting and suspension of the drive aggregate or unit satisfactory in every respect is achieved thereby.

As a solution to the problem outlined hereinabove, it is proposed in accordance with the present invention to construct the bearing supports or mountings considerably stiffer in the direction of the crankshaft axis and in the direction of the moments occurring about the crankshaft axis as well as in the direction of the gravitational force than in the direction of the longitudinal cylinder axes.

Pursuant to one realization in accordance with the present invention it is proposed to construct the bearings as sleeve-type or bushing-type bearings which are more resilient or yielding in the longitudinal direction thereof than in the diametrical or radial direction thereof whereby the longitudinal axes of the elastic sleeves or bushings extend parallel to the cylinder axes and the diametric axes thereof in planes perpendicular to the cylinder axes.

Furthermore, the longitudinal axes of the two rearwardly disposed bearing sleeves which are disposed equidistant from the crankshaft axis coincide with each other and cross the axis passing through the center of gravity which extends through the forwardly disposed bearing.

Furthermore, according to another feature in accordance with the present invention, it is also possible to construct the forward bearing sleeve and the two rearward bearing sleeves of the same dimension and to make, by any suitable known means, the spring constant or the spring characteristic of the forward bearing sleeve twice as great as the spring constant or spring characteristics of the two rearward sleeves.

By the use of an arrangement in accordance with the present invention it is possible to achieve an overall effect, in a simple manner, exclusively with the aid of those types of bearings which, within the meaning of the known prior art suspensions of the drive aggregates or units, actually only represent main bearings, and which effect could be realized in practice up to the present invention only by additional means or auxiliary support means. Such additional or auxiliary support means as used in the prior art type suspensions, however, not only increase the cost of manufacture thereof but also occupy space which may be used for other structural parts in a suspension according to the present invention.

As a result of the more elastic construction of the bearings in the direction of the free inertia forces, a softer absorption of the aforementioned forces which in part may be quite considerable is made possible which in turn protects the drive unit parts and the vehicle frame and vehicle body, and, in particular, entails a very quiet idling of the engine which previously was rather objectionable at times, especially with engines having relatively fewer cylinders.

The bearings or mountings in accordance with the present invention are relatively stiffer in the radial direction thereof. This feature is particularly important for mounting and securing the drive aggregate in the direction of the crankshaft longitudinal axis in order to assure and obtain an unobjectionable support and completely satisfactory bracing of the clutch pressure during unclutching. Furthermore, the bearings according to the present invention are particularly suitable so that, during shifting and clutching, the drive aggregate or unit does not carry out excessive angular movements which might lead to dangerous resonant swinging movements. Furthermore, the relative displacements of the drive aggregate or unit which occur in the vehicle longitudinal direction are kept within relatively small limits within the bearings thereof during braking and accelerating of the vehicle.

Accordingly, it is an object of the present invention to provide a suspension for a drive unit or aggregate, especially for motor vehicles which obviates the disadvantages encountered in the prior art devices.

It is another object of the present invention to provide an engine suspension for a driving unit consisting of an internal combustion engine with essentially horizontally disposed cylinders, of a clutch housing and of a change speed transmission housing all combined into a unitary structure which is extremely simple in construction and efficacious in operation.

Still another object of the present invention is the provision of a suspension for a piston-type, internal combustion engine drive unit which is particularly suited to absorb all the forces and moments occurring therein during operation of the vehicle.

A further object of the present invention is the provision of a suspension for a piston-type internal combustion engine provided with approximately horizontally disposed cylinders which utilizes only three bearing supports or mountings while obviating the necessity of auxiliary supports.

Still a further object of the present invention is the provision of an elastic suspension for a piston-type internal combustion engine which is particularly suitable for engines having a relatively small number of cylinders.

Figure 2:
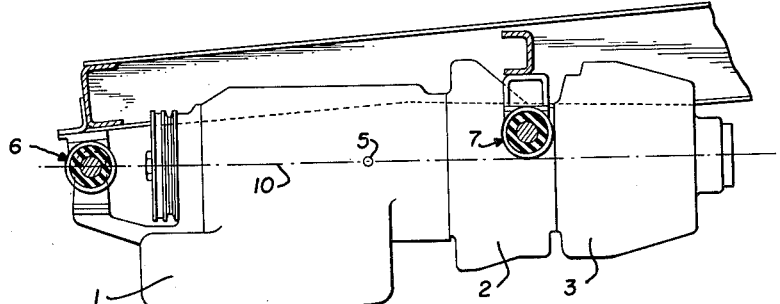
Figure 3:
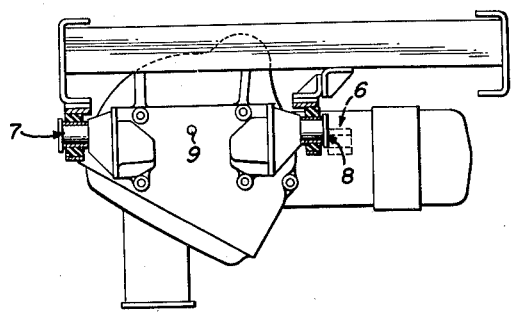
Figure 4:
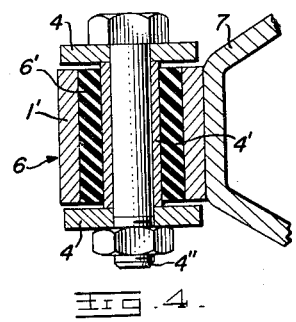

These and other objects, features and advantages of the present invention will become more obvious from the following description when taken in connection with the accompanying drawing which shows, for purposes of illustration only, one embodiment in accordance with the present invention, and wherein:

FIGURE 1 is a plan view of a suspension for a drive unit at the vehicle frame in accordance with the present invention, FIGURE 2 is a side elevational view of FIGURE 1 showing the main bearing supports in cross section, FIGURE 3 is a rear elevational view of the suspension of the drive unit illustrated in FIGURE 1 with the rear bearings thereof shown in cross section, and FIGURE 4 is a sectional view indicating in greater detail the structure of one of the bearings.

The term vehicle superstructure is used in the specification and in the claims herein to designate a relatively stationary part of the vehicle such as the frame, chassis or vehicle body, for instance, of a self-supporting-type vehicle body construction.

Referring now to the drawing wherein like reference numerals are used throughout the various views to designate like parts, the several views thereof show a drive aggregate or unit which includes a piston type internal combustion engine 1, a clutch 2 and a change speed gear 3 of any suitable conventional construction. The drive aggregate or unit consisting of the internal combustion engine 1, of the clutch 2 and of the change-speed transmission 3 combined into a unitary block is suspended or supported at the vehicle superstructure such as the vehicle frame 4 which may be of any suitable arrangement, for example, of longitudinal and transverse frame bearer members. The forwardly disposed bearing or mounting 6 is arranged along the inertia axis 10 extending approximately in the longitudinal direction of the vehicle through the center of gravity 5 whereas the two rearwardly disposed bearings 7 and 8 are arranged on both sides of the crankshaft longitudinal axis 9 equidistant therefrom.

All of the three bearings 6, 7 and 8 are identical as regards the constructive assembly thereof and include an elastic sleeve or bushing so that the bearings 6, 7 and 8 are considerably softer in the direction of the longitudinal axes 11 and 12 thereof than in the radial direction thereof. The longitudinal axes of the two rearwardly disposed bearings or mountings 7 and 8 coincide geometrically, as is readily visible from FIGURE 1.

FIGURE 4 illustrates in detail the construction and assembly of bearing 6. An elastic bushing 6' surrounds a sleeve 4' which in turn encompasses a bolt or pin member 4''. A ring member 1' which is integrally secured to the engine 1 is mounted concentrically to the elastic bushing 6'.

The free inertia forces 13, designated in FIGURE 1 by the arrowheads between the points P and P', of the piston-type internal combustion engine 1 extend essentially parallel to the direction of the longitudinal axes 11 and 12 of the forward bearing or mounting 6 and of the rearward mountings 7 and 8. By the use of the particular arrangement of the three bearings 6, 7 and 8 as disclosed herein and by the particular type of elastic bearing used in connection therewith it is possible to absorb all of the forces and stresses enumerated hereinabove in a satisfactory and advantageous manner so that the three point suspension of the drive unit in accordance with the present invention is completely satisfactory in operation even without the aid of additional supports or mountings.

The spring constant or spring characteristic of each elastic bearing may thereby be varied by suitably selecting the particular elastic material therefor and by varying the dimensions of the various parts thereof which determine the same, as is well known in the prior art. Consequently, the spring constant of one of the two rearward bushings may be made greater than that of the other of said two rearward bushings depending upon the direction of rotation of the engine's crankshaft.

While I have shown and described one preferred embodiment in accordance with the present invention, it is understood that the same is not limited thereto but is susceptible of many changes and modifications within the spirit and scope of the present invention and I, therefore, do not wish to be limited to the details described and illustrated herein but intend to cover all such changes and modifications as are encompassed by the scope of the appended claims.

I claim:

1. An elastic suspension in combination with an approximately horizontally arranged internal combustion engine of the piston type having cylinder means having substantially horizontal axes, a crankshaft driven by said engine, a vehicle superstructure, and three mounting means for elastically suspending said engine from said vehicle superstructure and including a forward elastic bushing having an axis parallel to the axes of said cylinder means and passing through the inertia axis of the engine, two rearward elastic bushings disposed on opposite sides of the crankshaft axis, said rearward bushings being disposed with their axes parallel to that of said forward bushing, said forward and rearward bushings being relatively more stiff in the direction of the crankshaft axis and in the direction of the moments about said crankshaft axis as well as in the direction of gravitational forces than in the direction of the axes of said cylinder means.

2. An elastic suspension according to claim 1, wherein each of said bearings is an elastic sleeve-type bearing which is more yielding in the direction of the longitudinal axis thereof than in the diametric direction thereof.

3. An elastic suspension according to claim 1, wherein the longitudinal axes of said two rearward bearings coincide with each other and cross the axis passing through the center of gravity.

4. An elastic suspension according to claim 1, wherein said two rearward bearings are of the type having a longitudinal axis, the longitudinal axes of said two rearward bearings coinciding with each other and said two rearward bearings being equidistant from said crankshaft axis.

5. An elastic suspension in combination with an internal combustion engine of the piston type provided with cylinder means having horizontally disposed axes, a crankshaft driven by said engine, a vehicle superstructure, and elastic means for elastically suspending said engine from said vehicle superstructure including only one forward bearing provided with an elastic bushing extending through an axis passing through the center of gravity and two rearward bearings each provided with an elastic bushing disposed on both sides of the longitudinal crankshaft axis about equidistant therefrom, all three elastic bushings having their respective longitudinal axes parallel to those of said cylinder means, said bearings being relatively more stiff in the direction of the crankshaft longitudinal axis and in the direction of the moments about said crankshaft longitudinal axis as well in the direction of the gravitation forces than in the direction of the longitudinal axes of the cylinders.

6. An elastic suspension according to claim 5, wherein the elastic bushing of said forward bearing and the two elastic bushings of said rearward bearings are identical in size.

7. An elastic suspension according to claim 6, wherein the spring constant of said forward bushing is twice as large as the spring constant of said two rearward bushings.

8. An elastic suspension according to claim 5, wherein the spring constant of one of the two rearward bushings is greater than the other of said two rearward bushings depending on the direction of rotation of the crankshaft of said internal combustion engine.

References Cited in the file of this patent
UNITED STATES PATENTS

| | | |
|---|---|---|
| 1,701,394 | Short | Feb. 5, 1929 |
| 2,648,510 | Henshaw | Aug. 11, 1953 |
| 2,772,649 | Gensheimer | Dec. 4, 1956 |

FOREIGN PATENTS

| | | |
|---|---|---|
| 638,988 | Great Britain | June 21, 1950 |